Figure 1:
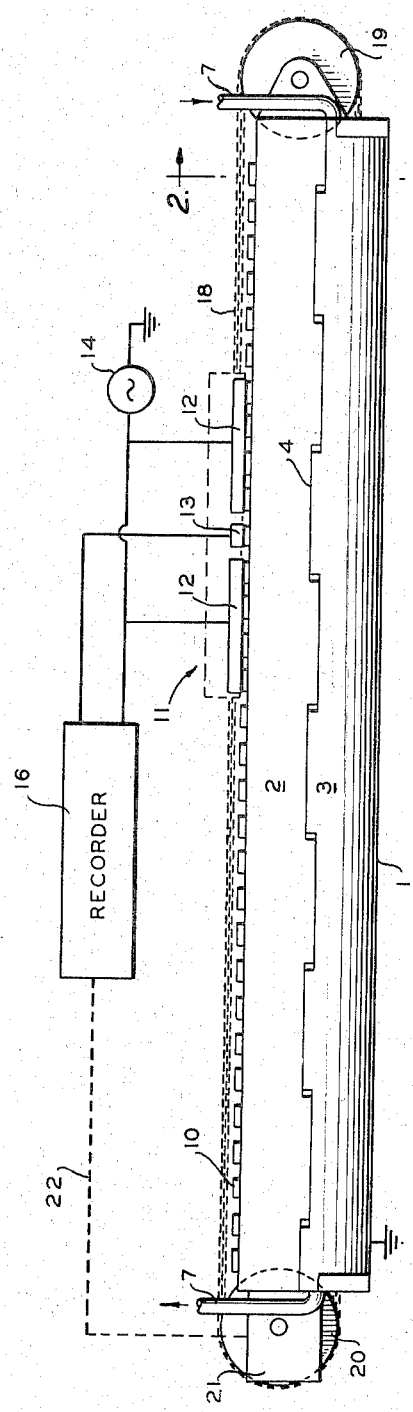

Feb. 24, 1959

J. D. OWEN 2,875,401

CORE LOGGING DEVICE

Filed Sept. 27, 1954

3 Sheets-Sheet 1

INVENTOR.
J. D. OWEN
BY Hudson & Young
ATTORNEYS

Feb. 24, 1959 — J. D. OWEN — 2,875,401
CORE LOGGING DEVICE
Filed Sept. 27, 1954 — 3 Sheets-Sheet 2

INVENTOR.
J. D. OWEN
BY Hudson & Young
ATTORNEYS

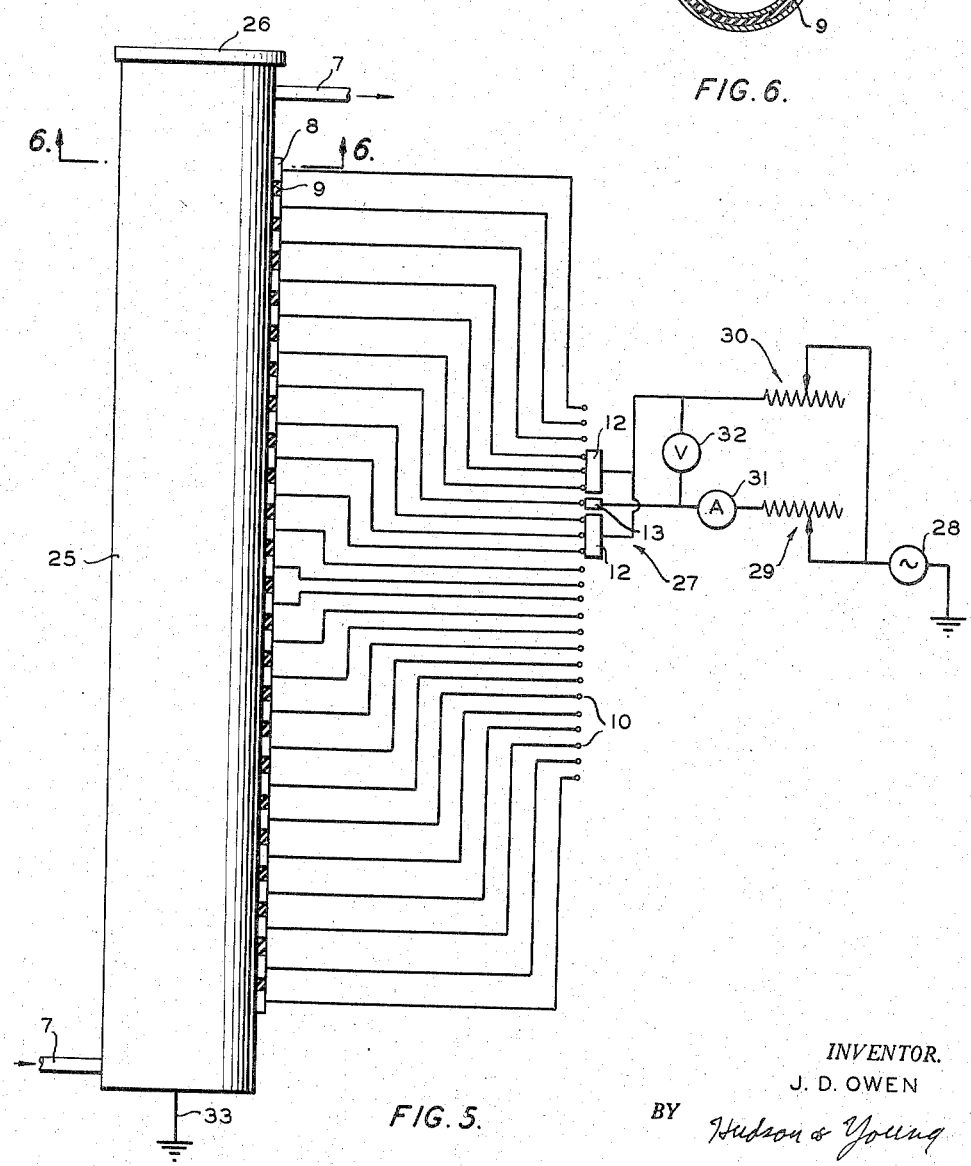

United States Patent Office 2,875,401
Patented Feb. 24, 1959

2,875,401

CORE LOGGING DEVICE

Joe D. Owen, Bartlesville, Okla., assignor to Phillips Petroleum Company, a corporation of Delaware Application September 27, 1954, Serial No. 458,457

9 Claims. (Cl. 324—13)

This invention relates to an apparatus for electrically exploring a core removed from a drill hole and more particularly to an improved apparatus for electrically logging a drill core.

In drilling for minerals or oil it is often desirable to obtain information which will identify the geological strata penetrated by the drill hole. Among other methods developed to accomplish this purpose are methods of electrically well logging. Electrical well logging of bore or drill holes is carried out by various types of devices in which two or more electrodes are lowered into the well hole for the purpose of determining certain physical properties associated with the different formations surrounding the well hole.

It is often desirable to make certain chemical and physical analysis on the strata itself. In such cases, a core, or section of the strata, is removed by the use of core drilling tools, such as a diamond core drilling apparatus, for further examination. By utilizing such analytical data in conjunction with a well logging chart, much information is obtained which is useful in interpreting the well logging chart. If an electric log is made on the core itself, the correlation of this data is greatly simplified. The use of such data has made it possible to study the earth strata surrounding the well hole by simple well logging and makes it unnecessary, in many cases, to resort to the more expensive core drilling. In the copending application of Raymond G. Piety filed August 27, 1954 Serial No. 452,518, a guard electrode method and apparatus is disclosed and claimed for obtaining such a log on a drill core.

I have devised an apparatus which is particularly useful in logging a drill core. The apparatus of my invention is particularly useful in the method of Piety's in that by my apparatus contact resistance is reduced to a minimum.

An object of this invention is to provide an improved apparatus for electrically logging of drill cores.

Another object of this invention is to provide an apparatus for core logging having negligible contact resistance.

Other objects and advantages will be apparent from the detailed description and from the accompanying drawings and the claims.

Figure 2:
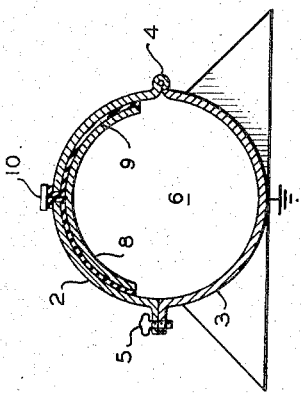
Figure 3:
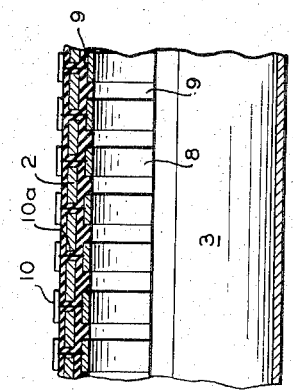
Figure 4:
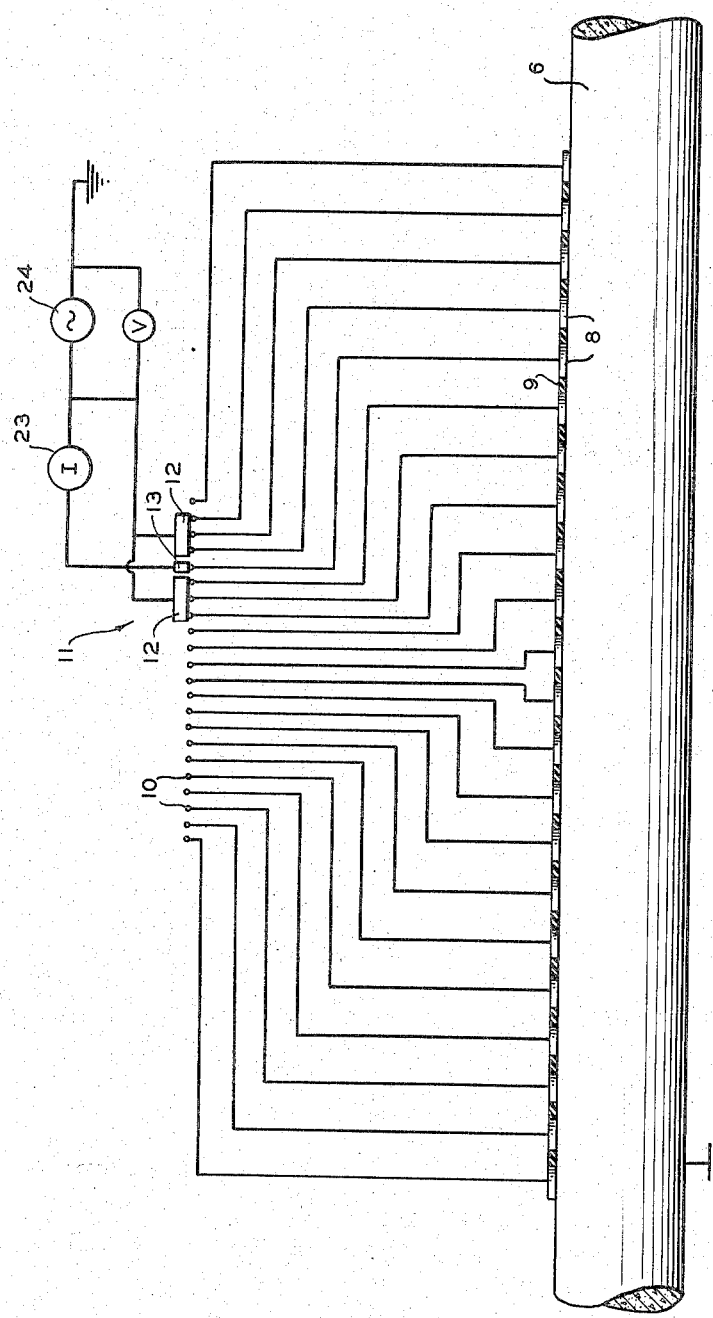

According to the present invention a core removed from a drill hole by means of a diamond core bit or the like is placed in a suitable holder and is contacted by a plurality of electrodes. Means are provided for applying a potential to a plurality of electrodes on either side of a single electrode and through the core and applying a separate potential to this single electrode. Means are provided for progressively moving the position of the said potentials along the core so that each electrode becomes in turn the single electrode. Means are provided for determining the current flowing from the single electrode through the core. Means can be provided for recording the position of the single electrode and the current flowing. Also means can be provided for balancing the current flowing through the plurality of electrodes and the single electrode. Provision can also be made for circulating mud around the core. My invention will be further described by referring to the attached drawings of which:

Figure 1 is a side view, partially in elevation of an embodiment of my invention wherein the core to be logged is placed in a split cylinder, the upper half of said cylinder being fitted with a plurality of electrodes extending along its entire length, Figure 2 is an end view of the apparatus of Figure 1 taken along the lines 2—2, Figure 3 is a section of Figure 1 showing the arrangement of the electrodes, Figure 4 is a schematic illustration of the circuit of my invention, Figure 5 is a schematic view of an embodiment of my invention wherein the electrodes completely surround the core, and Figure 6 is a top view of the apparatus of Figure 5 taken along the lines 6—6, Referring to Figures 1, 2 and 3, the device of this embodiment consists of an elongated cylinder 1 split into an upper half 2 and a lower half 3 and hinged at 4 along one of the junctions. The other junction is equipped with a sealing means 5 for sealing the two sections together with a core 6 inside. Conduit means 7 are provided at the ends of the cylinder for forcing drilling mud through the cylinder and around the core thus simulating drill hole conditions.

The upper half 2 of the cylinder 1 has a plurality of strip electrodes 8 generally ¼ to 1 inch in width and spaced generally ½ of the electrode width apart and spaced along the length of the cylinder. These electrodes are separated from each other and the housing by an insulating material 9. Each of said electrodes is connected to a contact button 10 or the like outside the cylindrical housing. These electrodes 8 are so arranged that they are in close proximity with the core when the cylinder is closed and sealed. In general, only a film of mud will separate the core and electrode.

A sliding contact 11 is provided to slide along the contact buttons 10. This contact 11 is comprised of an elongated brush 12 with a short brush 13 intermediate the ends of the long brush. The short brush will generally be only long enough to contact one of said buttons while the elongated brush will be so constructed to contact at least three buttons on either side of the button being contacted by the short brush. A source 14 is provided to provide a potential across the core 6 to a grounded surface 3 from the elongated brush 12 of contact 11. The source 14 is connected through recorder 16 so as to put a potential across the core from short brush 13. The sliding contact 11 is moved via means of chain 18 which in turn moves around wheels 19 and 20. Wheel 20 is connected through gear box 21 and mechanical linkage 22 to the recorder 16. By such an arrangement, the recorder will record current vs. position.

Many modifications can be made in the apparatus of this embodiment of my invention. For example, the electrode can be made to completely encircle the core when the cylinder is closed. The measuring circuit shown is schematic and simple. In practice, many refinements would be made. For example, means would be provided for measuring and balancing the potential across the core from both the elongated and short brushes. Other means of moving the brushes and recording or measuring the current can be employed. Instead of a moving brush, a switch as shown in Figure 4 can be used. The advantage in the apparatus of this invention being to contact the core with a plurality of stationary electrodes and obtaining a guard electrode effect by connecting certain electrodes in a prescribed manner and thereby eliminate contact resistance except between metal to metal. This is further shown in connection with Figure 2.

Referring to Figure 2, the core to be logged is placed in grounded trough 3 which is adapted to fit the core. Lid 2 containing a plurality of closely spaced electrodes 8 is pivotably mounted to the trough 3 by means of pivot 4. The lid 2 is clamped over the core by means of wing nut 5 which brings the electrodes in close contact with the core. The core can be mud washed prior to closing the lid if so desired or provision such as conduit 7 can be made for forcing mud through the cylinder after closing. Each electrode will be connected to contact points 10 over which the brush as shown in Figure 1 rides. The only moving contact then is between the brush and the contact points.

Referring to Figure 3 which is a schematic section of Figure 1, the spacing of the electrodes 8 along the upper half 2 of the cylinder is shown. These electrodes are connected to the contact buttons 10 via leads 10a. The electrodes, contact buttons and leads are isolated by insulation material 9.

Referring to Figure 4 which is a schematic wiring diagram for my apparatus, the elongated brush 12 is considerably longer than is the short brush 13. Each section of the elongated brush should be at least three times as long as the short brush for best results and even a longer brush is preferred. By having the elongated brush covering several electrodes while the short brush contacts only one electrode, the average current flowing from the elongated brush will be comparatively constant since the resistance offered will be the average for the several electrodes. This insures a fairly constant guard ring or field around the electrode acting as the exploring electrode, that is the one from which current flowing is measured. The purpose of this guard ring is to insure radial flow from the exploring electrode through the core. Current flowing through brush 13 is measured by ammeter 23 which is preferably a recording ammeter of known type. The current flowing through brush 13 is inversely proportional to the resistance of the core directly beneath the electrode being contacted by the brush 13 and can be conveniently recorded against the position of said brush along the length of the core. The current source is shown as an alternating current source 24, however, it should be understood that a direct current source can be used.

Figures 5 and 6 show an embodiment of my invention wherein the electrodes completely surround the core. As shown, the core holder is a cylinder 25 containing a plurality of electrodes 8, however, the split cylinder of Figure 1 can be used, the circle being closed when the cylinder is closed. To insert the core, the lid 26 is removed and the core inserted until it contacts the grounded bottom of the cylinder. A plurality of electrodes insulated from the shell and each other surround the core throughout the length of the cylinder except for a short distance at either end. Since the current flows through the length of the core as will be explained, a short distance at either end, at least the length of the cylinder radius, is free of operative electrodes, each electrode is connected via electrical conductors to contact buttons 10 on switch 27. While this switch is shown as flat for simplicity of illustration, the contact buttons will generally be arranged in a circle. This switch has a movable brush assembly comprised of elongated section 12 with short section 13 intermediate its ends. After the lid 26 is replaced, mud can be circulated around the core via conduit 7.

This cylinder 25 is shown vertical. It, as well as the embodiment of Figure 1, can be mounted either vertically or horizontally or at any other desired angle. In this embodiment, Figure 4, the vertical mount has the advantage of a positive contact with the ground and the advantage of placing the core. For example, the core puller could be used to lower the core into the cylinder.

In this case, vertical mount, the lid 26 would not be required since the mud would completely cover the core on filling.

The schematic wiring diagram shown in connection with Figure 5 is particularly adapted for this invention. Current source 28 is connected via variable resistances 29 and 30 to brushes 13 and 12 respectively. Ammeter 31 is provided between variable resistance 29 and brush 13 to measure the current flowing to the center electrode while voltmeter 32 between the two brushes is used to detect variation in potential between the two brushes. The potential is balanced by means of the variable resistances.

In the embodiment of Figure 5, the current flows between brush 13 and ground 33 through the core. The guard current, at least 3 electrodes wide, on either side of the exploring current flows between brush 12 and the ground 33. By using the wide band of current on both sides of the exploring current, variations in path are minimized and the differences in current changes as shown by ammeter 31 will be due to difference in resistance directly beneath the electrode contacting brush 13.

It will, of course, be obvious to those skilled in the art, that a recording ammeter can be used which could be mechanically connected to switch 27 which would record the current flow against the position of the switch.

The main advantage of this scheme is the elimination of any type of moving electrode touching the cores. The modification shown in Figures 4 and 5 provides a simplified means for making the measurement in that only the knob or dial on a rotating switch or the like is moved in making the measurements. Since the moving electrodes do not touch the core, this eliminates the possibility of contact resistance between the moving electrode and the core from masking any change in core resistance.

Many modifications can be made in this equipment and the mode of operation as will be obvious to those skilled in the art. For example, the mud can circulate while measurements are being made, however, I have found that more consistent results are obtained if the mud is static during the measuring operation. Several modifications have been suggested in the apparatus in conjunction with the description of the figures.

I claim:

1. An apparatus for electrically logging a drill core comprising in combination a trough having a conducting surface for supporting said core; a lid pivotably mounted along said trough; a plurality of electrodes spaced throughout the length of said lid; means for fastening said lid to said trough so that said electrodes contact a core held therein; a plurality of contact buttons each connected respectively to each of said electrodes via electrical conductive means; an elongated brush having a short brush intermediate its ends adapted to contact a plurality of contact buttons on both sides of a single contact button when said single contact button is contacted by said short brush; means for moving said elongated brush and said short brush in fixed relationship one to the other so that each button is in turn contacted by said short brush; a current source; means for measuring current flow; conductive means connecting said current source to said elongated brush; conductive means connecting said current source to said short brush through said current measuring means; and conductive means connecting the opposite terminal of said current source to said conducting surface of said trough.

2. An apparatus for electrically logging a drill core comprising in combination a cylindrical container adapted to receive said drill core having a plurality of peripheral electrodes spaced longitudinally therein and insulated one from the other; a plurality of contact points each connected respectively to said electrodes via electrical conductive means; an elongated brush having a short brush intermediate its ends adapted to contact a plurality of contact points when said short brush contacts a single contact point; means for moving said elongated brush and said short brush in fixed relationship one to the other so that said short brush contacts each said contact point in turn as said brushes are moved; a current source; means for measuring current flow; conductive means connecting said current source to said elongated brush; conductive means for connecting said current source to said short brush through said current measuring means; and conductive means connecting the opposite terminal of said current source to a core to be logged when such a core is placed in said cylinder.

3. Apparatus for electrically logging a drill core comprising means for contacting said core with a plurality of spaced electrodes which are insulated from one another, means for connecting said core to a point of reference potential, means for applying a voltage between said point of reference potential and a plurality of said electrodes having a single one of said electrodes spaced intermediate the ends thereof, means separately applying a voltage between the single electrode intermediate the ends of said plurality of electrodes and said point of reference potential, means for moving said voltage applying means along said electrodes so that adjacent electrodes become in turn the single electrode, and means to measure current through the single electrodes.

4. Apparatus for electrically logging a drill core comprising means for contacting said core with a plurality of electrodes which are insulated from one another, said electrodes being of substantially equal width, the spacings between adjacent electrodes being substantially equal, said width being one-fourth to one inch and said spacing being substantially one-half of said width, means for connecting said core to a point of reference potential, means for applying a voltage between said reference potential connecting means and at least three of said electrodes on both sides of one of said electrodes, means for applying a voltage between said one electrode and said reference potential connecting means, means for measuring current through said one electrode, and means to move said voltage applying means along said electrodes so that adjacent ones of said electrodes become in turn the said one electrode.

5. Apparatus for electrically logging a drill core comprising a container adapted to hold a drill core to be logged, a plurality of substantially equally spaced electrodes positioned along the length of said container to contact the surface of the core to be logged, a plurality of conductive contact points connected to respective ones of said electrodes, an elongated brush adapted to contact a plurality of said contact points, a second electrode positioned intermediate the ends of said elongated brush to contact one of said contact points, means to move said elongated brush and said second brush in fixed relationship with one another along said contact points so that said second brush progressively contacts each of said contact points, means to apply a potential between said elongated brush and said container, means to apply a potential between said second brush and said container, and means to measure current through said second brush.

6. The apparatus of claim 5 further comprising means to record the position of said second brush with respect to said container as a function of the current through said second brush.

7. The apparatus of claim 5 further comprising means to coat the core to be logged with a drilling mud slurry.

8. Apparatus for electrically logging a drill core comprising a plurality of electrodes, means to position said electrodes so as to contact a core to be logged in spaced relationship with one another, a brush, means connecting a voltage source between said brush and the core to be logged, means to move said brush to engage said electrodes along the core in succession, and means to measure current through said brush.

9. Apparatus for electrically logging a drill core comprising a plurality of electrodes in contact with the core to be measured and in spaced relationship with one another, first means applying a first potential to said core, second means applying a second potential different from said first potential to one of said electrodes, means to measure the resulting current through said one electrode, third means applying a third potential different from said first potential to electrodes on each side of said one electrode, and means to move said second and third means progressively along said core so that adjacent electrodes become said one electrode in succession.

References Cited in the file of this patent
UNITED STATES PATENTS

| | | |
|---|---|---|
| 2,047,638 | Kott | July 14, 1936 |
| 2,094,234 | Drain | Sept. 28, 1937 |
| 2,592,125 | Doll | Apr. 8, 1952 |
| 2,613,250 | Bilhartz | Oct. 7, 1952 |
| 2,621,232 | Spalding | Dec. 9, 1952 |
| 2,621,233 | Spalding | Dec. 9, 1952 |